US008239775B2

(12) United States Patent
Beverland et al.

(10) Patent No.: US 8,239,775 B2
(45) Date of Patent: Aug. 7, 2012

(54) METHOD AND APPARATUS FOR A COMPUTER SIMULATED ENVIRONMENT

(75) Inventors: Conor Peter Beverland, Winchester (GB); Christopher Edward Sharp, Winchester (GB); Matthew Whitbourne, Horndean (GB)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 12/247,180

(22) Filed: Oct. 7, 2008

(65) Prior Publication Data

US 2009/0158174 A1    Jun. 18, 2009

(30) Foreign Application Priority Data

Dec. 14, 2007  (EP) .................................... 07123262

(51) Int. Cl.
*G06F 3/048*      (2006.01)
*G06F 3/00*       (2006.01)

(52) U.S. Cl. ........ 715/757; 715/758; 715/765; 715/766; 715/788; 715/802; 715/848; 715/849; 715/850

(58) Field of Classification Search ................ 715/757, 715/758, 848, 850, 760, 765, 766, 788, 802, 715/849
See application file for complete search history.

(56) References Cited

U.S. PATENT DOCUMENTS

| | | | | |
|---|---|---|---|---|
| 5,956,038 | A * | 9/1999 | Rekimoto ..................... | 345/419 |
| 6,026,377 | A * | 2/2000 | Burke .......................... | 705/27.2 |
| 6,307,567 | B1 * | 10/2001 | Cohen-Or .................... | 345/619 |
| 6,389,375 | B1 * | 5/2002 | Thomsen et al. ................ | 703/2 |
| 6,405,249 | B1 * | 6/2002 | Matsuda et al. .............. | 709/224 |
| 7,155,680 | B2 | 12/2006 | Akazawa et al. | |
| 7,191,220 | B2 * | 3/2007 | Ohwa .......................... | 709/206 |
| 7,792,801 | B2 * | 9/2010 | Hamilton et al. ............. | 707/655 |
| 7,904,323 | B2 * | 3/2011 | Wynn et al. .................. | 709/201 |
| 7,973,786 | B2 * | 7/2011 | Gyorfi et al. ................. | 345/419 |
| 2004/0015608 | A1 | 1/2004 | Ellis et al. | |
| 2006/0122917 | A1 | 6/2006 | Lokuge et al. | |
| 2007/0192727 | A1 * | 8/2007 | Finley et al. ................. | 715/781 |
| 2007/0288598 | A1 * | 12/2007 | Edeker et al. ................ | 709/217 |
| 2008/0034326 | A1 * | 2/2008 | Chiu et al. ................... | 715/849 |
| 2009/0106671 | A1 * | 4/2009 | Olson et al. .................. | 715/757 |
| 2009/0125481 | A1 * | 5/2009 | Mendes da Costa et al. ..... | 707/3 |
| 2009/0318224 | A1 * | 12/2009 | Ealey ............................. | 463/31 |
| 2011/0185057 | A1 * | 7/2011 | Waugaman et al. ......... | 709/224 |

* cited by examiner

*Primary Examiner* — Nicholas Augustine
(74) *Attorney, Agent, or Firm* — Janaki K. Davda; Konrad Raynes & Victor LLP

(57) ABSTRACT

This invention relates to a computer simulated environment, such as a virtual world, and to the identification of a user entering the virtual world and user context in the virtual world model. An output of the virtual world model may be rendered using objects in the virtual world model. Previous versions of the rendered objects may then be located in associated user memory and specified differences between the rendered objects and the previous versions of the objects may be identified. A layer of the identified differences may then be rendered on the rendered output of the virtual world model.

24 Claims, 3 Drawing Sheets

RENDERING A VIRTUAL WORLD MODEL

202 — Identifying a user entering the virtual world and the user context in a virtual world model.

204 — Identifying a subset of the virtual world model according to the user context comprising objects within a particular range of the user.

206 — Rendering output to a user of the objects identified in the subset of the virtual world model.

208 — Locating, in associated user memory, previous versions of the objects in the subset and identifying specified differences between the rendered subset of objects and the previous versions of the objects.

210 — Rendering a layer of the identified differences on the initial rendering of the user view of the subset of the virtual world model.

*FIG. 2*

METHOD AND APPARATUS FOR A COMPUTER SIMULATED ENVIRONMENT

This invention relates to a method and apparatus for a computer simulated environment, and more specifically, to a computer simulated environment such as a virtual world.

BACKGROUND

A virtual world is a type of computer simulated environment in which a user interacts with the environment in some way, either by viewing or hearing the environment, or by changing the environment. Often the environment is independent of the user. In a city simulation game, the user is a single all-powerful character and does not interact with other users. In a social interaction environment, multiple users are represented by avatar objects and interact with each other. A user can enter and exit the environment and things in the environment can persist or change depending on user interaction or not. In a city simulation game, city things in the environment change as a factor of time and are also controlled by the user in some way. In a social interaction environment, things also change as a factor of other users changing them or interacting with them. The more complex a virtual world, the more feature rich the environment, and the more difficult it is for a user to keep up with all of the changes that have taken place.

SUMMARY OF INVENTION

According to one aspect of the present invention, a method of rendering a virtual environment, the virtual environment having a virtual model, comprises: identifying a user entering the virtual environment and user location in the virtual model; rendering an output of the virtual model using objects in the virtual model; locating, in associated user memory, objects associated with the virtual world; identifying differences between the virtual world and the user memory; and rendering a layer of the identified differences on the rendered output of the virtual model.

According to another aspect of the invention, a method of rendering a virtual environment, the virtual environment having a virtual model, comprises: identifying a user entering the virtual environment and user location in the virtual model; rendering an output of the virtual model using objects in the virtual model; locating, in associated user memory, objects associated with the virtual world; identifying differences between the virtual world and the user memory; and rendering a layer of the identified differences on the rendered output of the virtual model indicating the identified differences by at least one of: highlighting, shading, or flashing, and further indicating the time since the object was changed or last viewed by the user.

According to another aspect of the present invention, a system of rendering a virtual world, the virtual environment having a virtual model, comprises: an input interface for identifying a user entering the virtual environment and user context in the virtual model; a rendering engine for rendering output of the virtual model using objects in the virtual model; a difference engine for locating, in associated user memory, previous versions of objects and for identifying specified differences between the virtual model and the user memory; and wherein said rendering engine is further adapted for rendering a layer of the identified differences on the rendered output of the virtual model.

According to an additional aspect of the present invention, a computer program product for simulating a virtual environment having a virtual model, the computer program product comprises: a computer usable medium having computer usable program code embodied therewith, the computer usable program code comprising: computer usable program code configured to: identify a user entering the virtual world and user context in the virtual model; render an output of the virtual model using objects in the virtual world model; locate, in associated user memory, previous versions of the rendered objects; identify specified differences between the rendered objects and the previous versions of the objects; and render a layer of the identified differences on the rendered output of the virtual model.

BRIEF DESCRIPTION OF THE SEVERAL VIEWS OF THE DRAWINGS

Embodiments of the invention will now be described, by means of example only, with reference to the accompanying drawings in which:

FIG. 2 is a method diagram of the process of the virtual world system of the present embodiment.

DETAILED DESCRIPTION

According to aspects of the present invention, there is provided a method, system and computer program product for rendering a virtual world where the virtual world has a virtual world model. In an embodiment of the invention, when visiting a virtual world shop, the present invention may indicate which items in front of the user are new, which have simply changed location, and which are old. This provides the capability for the users to have the new things in the virtual world pointed out to them. This allows more immediate access for users to the things that are likely to interest them. This allows a user to make more informed decisions about how to spend time and resources.

Existing web browsers may track user-selected hyperlinks and the selected hyperlinks may be indicated by being shaded a different colour. However, such an indicator is not known generally in computer-simulated environments.

Figure 1:
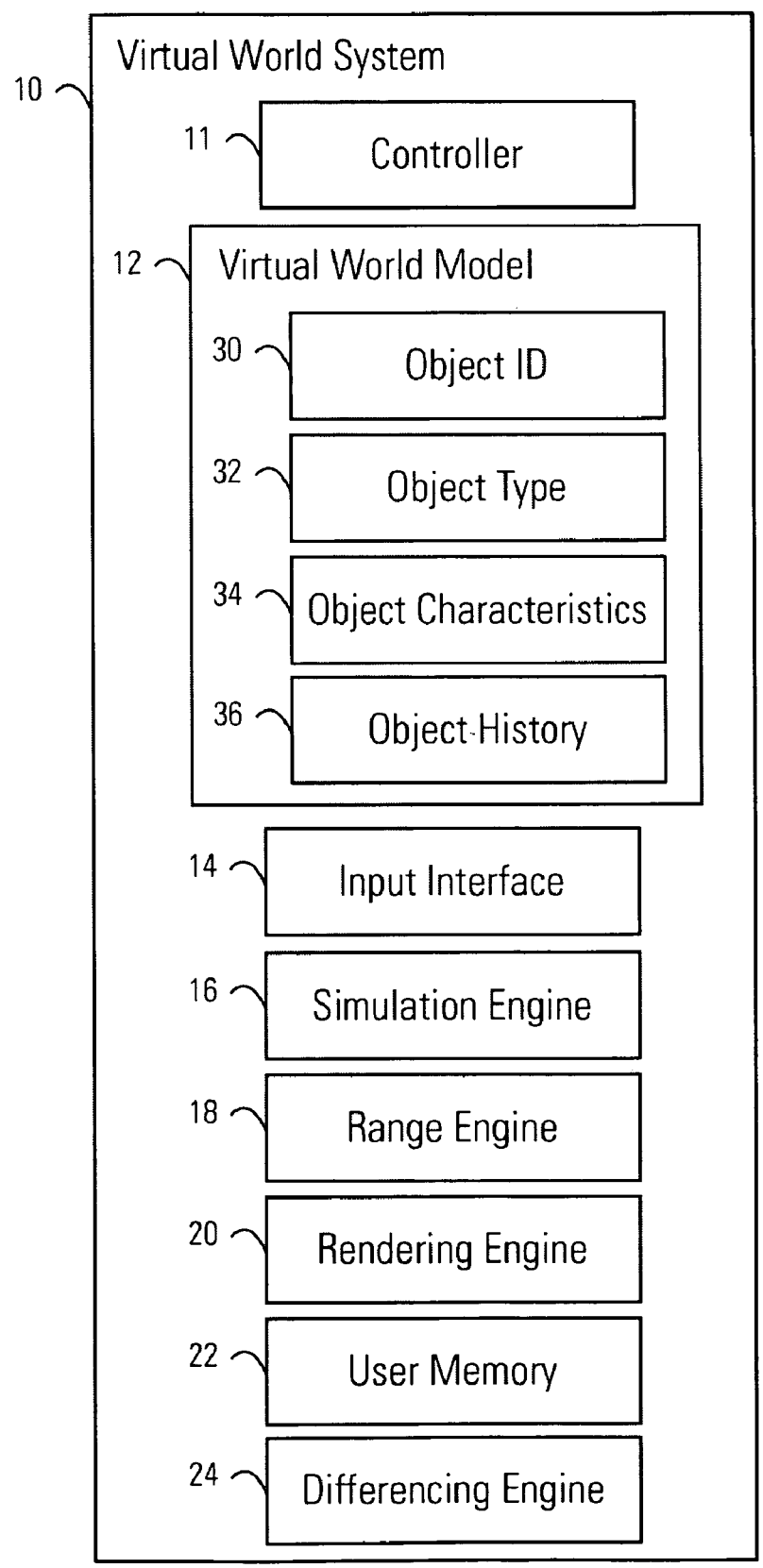
FIG. 1 is a schematic diagram of the virtual world system of the present embodiment.

A virtual world system 10 of the present embodiment comprises: controller 11; a virtual world model 12; an input interface 14; a simulation engine 16; a range engine 18; a rendering engine 20; user memory 22; and a differencing engine 24 (see FIG. 1). The controller 11 uses method 200 (see FIG. 2) to control a process of rendering the virtual world using the virtual world system.

The virtual world model 12 stores the features and characteristics of the world in a database. The model of present embodiment is a simplified prototype and comprises: object ID 30; object type 32; object characteristics 34 (including object location); and object history 36. The input interface 14 provides for identifying a user entering the virtual world. The input interface 14 allows a user to log into the virtual world using an identifier and optional password. The input interface 14 also provides for accepting instructions from the user for processing by the simulation engine 16 in the virtual world.

The simulation engine 16 provides for simulating the objects in the real world. In the present embodiment, the objects are inanimate and the simulation is limited to user location and view. In other embodiments where objects might be animated, the simulation engine 16 provides for the animation simulation. In this embodiment, the simulation engine 16 processes instructions from the user such as movement instructions, object interaction instructions and view instructions. In this way, the simulation engine 16 can simulate basic interaction between the user and the objects in the virtual world.

The range engine 18 identifies a subset of objects in the virtual world model 12 according to the user location and range. In the preferred embodiment, this includes range of view but in other embodiments includes sound and vibration. The size of the view or the size of the subset of the virtual world model 12 that is included in the view is determined by the type of view and could be selected by the user. For instance, one view might be a bird's eye view of the whole world and include all the objects in the virtual world. The preferred embodiment simulates real world vision so that small objects might not be visible if the size is small in relation to the size of the view. However, in another embodiment, this restriction might be adapted to give a form of enhanced vision (or sense). In this embodiment, the output is focused on view or visual output but audio and vibration output is provided for. The range engine 18 provides for identifying a rendering subset of the virtual world model 12 according to the user location and hearing range. The user range engine 18 provides for identifying a rendering subset of the virtual world model 12 according to the user location and vibration range.

The rendering engine 20 takes a subset of the model from the user range and renders a virtual world model 12 in the range of the user. This embodiment is limited to range of vision or view range and graphical representation of the objects in the view range. In other embodiments the object rendering engine 20 would render sound and vibration. The present embodiment describes a subset of the model because it is advantageous in terms of processing resources to reduce the number of objects processed to only the most relevant ones, where there may be a range where the subset is the whole set.

The rendering engine 20 also renders differences between the subset of objects in the model and associated objects in the user memory 22. The differences are rendered in accordance to user preferences associated with the user. For instance, a new object can be highlighted, shaded, flashing or have an audible or vibration alert according to user preference. A deleted object might be shown as a ghost image according to user preference. A changed object night have the change highlighted, shaded or flashing according to user preference. An object might also have an indication of the elapsed time since the object was last viewed by the user.

The user memory 22 stores a copy of any object that is identified by the range engine 18 for a particular user. The user memory 22 is grouped by user and then by object. The user memory 22 receives a stream of objects associated with a particular user from the range engine 18. When an object has already been stored by the user memory 22 then it is displaced as the latest version of the object and notifies the differencing engine 24 of the new object. The user memory 22 also stores the user preferences for rendering the difference output.

The differencing engine 24 also receives the stream of objects associated with a particular user from the range engine 18. The differencing engine 24 checks whether the object is a new object and notifies the rendering engine 20 to render the new object in a predefined way. The differencing engine 24 determines whether the new object differs from the previously stored object in any of the particular characteristics chosen by the user. The differencing engine 24 then notifies the rendering engine 20 to render the particular differing characteristics in a particular rendering style according to the choice of the user and the particular differing characteristic.

The user memory is updated with the difference from the virtual world model 12 or the identified subset of the user model is updated with the difference from the virtual world model 12.

The method 200 of controller 11 is described as follows with reference to FIG. 2. In step 202, a user entering the virtual world, a user location in the virtual world, and a time in a virtual world model 12 of the virtual world are identified in the input interface 14. Other positional information might be used to identify the position of the user in the virtual world space depending on how things are organised in the particular virtual world. In step 204, a subset of the virtual world model 12 is identified, in the range engine 18 according to the user context comprising all the objects within a particular range of the user.

In step 206, an output to a user of the objects identified in the subset of the virtual world model 12 is rendered in the rendering engine 20. The output is graphical output, audible output or vibration output. In step 208 previous versions of the objects in the subset are locating, by the differencing engine 24 in the user memory 22, and specified differences between the rendered subset of objects and the previous versions of the objects are identified. The specified difference types are user preferences associated with the user.

In step 210, a layer of the identified differences on the initial rendering of the user view of the subset of the virtual world model 12 is rendered by the rendering engine. The identified differences are rendered according to user preferences and can be according to type of object, difference or magnitude of a difference.

Figure 3:
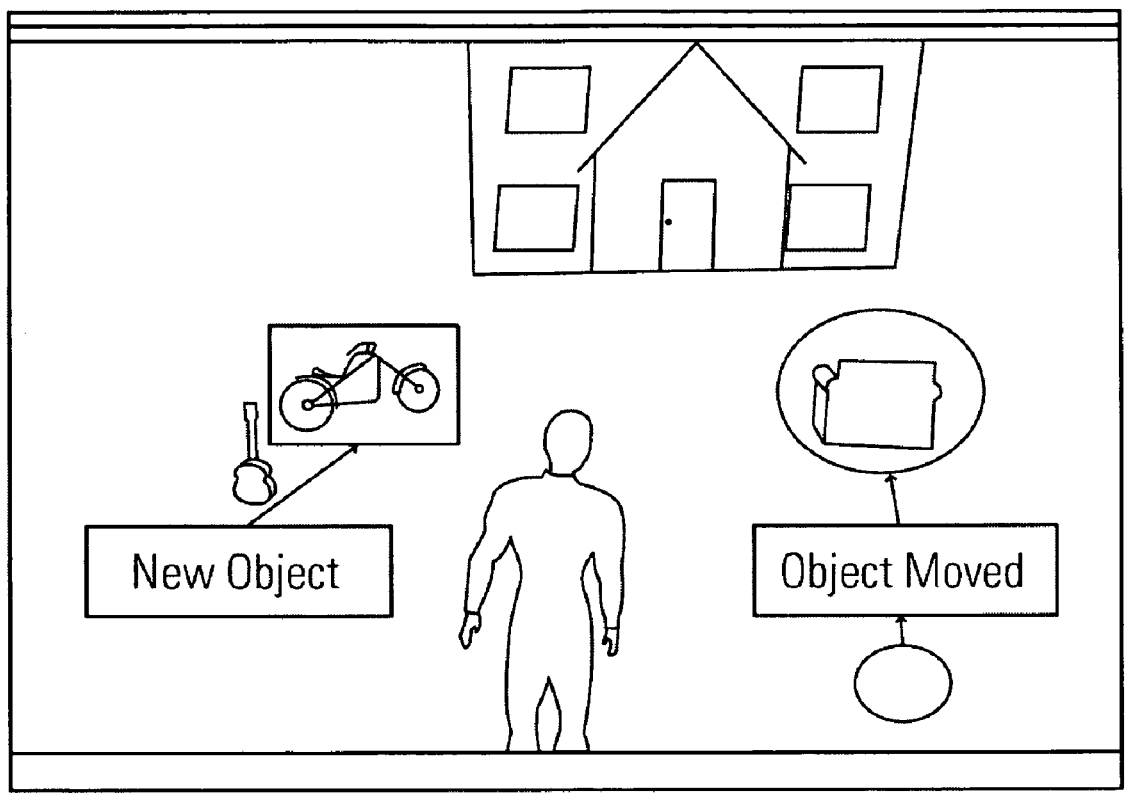
FIG. 3 is an example screen shot of the virtual world system of the present embodiment.

An example of the present embodiment is now described with reference to FIG. 3. A user, Matt (the figure in the centre bottom of FIG. 3), logs into the virtual world (step 202) with the user interface 14 at a position in front of his house (the building depicted in the FIG. 3) at midnight.

The range engine 18 identifies (step 204) a subset of the virtual world model 12 according to the user context comprising all the objects within a particular range of the user. The objects include a house, a motor bike and a chest. The rendering engine 20 renders (step 206) the objects identified in the subset of the virtual world model 12. The output is graphical and the motor bike, house and chest are shown rendered in FIG. 3.

The differencing engine 24 locates (step 208) previous versions of the objects in the user memory 22. Matt was previously in his house at 10 pm and, in his user memory are the house object, the chest object but no motor bike object. This is determined to be a new object since there is no motor bike previous object. The house object is the same object as in use memory so there is no difference. The chest object is different because it has been moved. Matt has specified in his user preferences that new objects and differences in location should be rendered. In this example, the specified rendering is to mark the objects as changed and to mark originating positions of objects that have been moved.

The rendering engine 20 renders (step 210) a layer of the identified differences on the initial rendering of the user view of the subset of the virtual world model 12. A box is drawn around the motor bike and labelled as a 'New Object'. A circle is drawn around the chest and it is labelled 'Object Moved', additionally a circle is drawn around the original position. Matt determines that a new person might have arrived, found the house key that he left under the chest, and be waiting for him inside the house.

In a different embodiment, the range engine 20 treats the user memory as a virtual world and identifies a subset of the objects in the user memory in range of the user. Objects that have been deleted from the virtual world can be identified by the differencing engine when the user memory subset is compared with the virtual model subset. Such objects can be rendered, by the rendering engine 20, in the virtual world as a transparent image of the object that will looks a bit like a ghost image.

It will be clear to one skilled in the art that the method of the present invention may suitably be embodied in a logic apparatus comprising logic means to perform the steps of the method, and that such logic means may comprise hardware components or firmware components.

It will be equally clear to one skilled in the art that the logic arrangement of the present invention may suitably be embodied in a logic apparatus, comprising logic means to perform the steps of the method, and that such logic means may comprise components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems.

Further, such instructions may be stored using any memory technology, present or future, including but not limited to, semiconductor, magnetic, or optical, or transmitted using any communications technology, present or future, including but not limited to optical, infrared, or microwave.

It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will select the proxy server code, determine on which computers to place the proxy servers code, transmit the proxy server code, and then install the proxy server code on the proxy computer. The process software will be transmitted to the proxy server then stored on the proxy server.

The process software is integrated into a client, server and network environment by providing for the process software to coexist with applications, operating systems and network operating system software, and then installing the process software on the clients and servers in the environment where the process software will function. The first step is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level. After ensuring that the software, where the process software is to be deployed, is at the correct version level that has been tested to work with the process software, the integration is completed by installing the process software on the clients and servers.

The process software is shared, simultaneously serving multiple customers in a flexible, automated fashion. It is standardized, requiring little customization and it is scalable, providing capacity on demand in a pay-as-you-go model. The process software can be stored on a shared file system accessible from one or more servers. The process software is executed via transactions that contain data and server processing requests that use CPU units on the accessed server. CPU units are units of time such as minutes, seconds, hours on the central processor of the server. Additionally, the assessed server may make requests of other servers that require CPU units. CPU units are an example that represents but one measurement of use. Other measurements of use include but are not limited to network bandwidth, memory usage, storage usage, packet transfers, complete transactions, etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimize the transfer of payments.

The process software may be deployed, accessed and executed through the use of a virtual private network (VPN), which is any combination of technologies that can be used to secure a connection through an otherwise unsecured network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid. The process software may be deployed, accessed and executed through either a remote-access or a site-to-site VPN. When using the remote-access VPNs, the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software. When using the site-to-site VPN, the process software is deployed, accessed and executed through the use of dedicated equipment and large-scale encryption that are used to connect a companies multiple fixed sites over a public network such as the Internet. The process software is transported over the VPN via tunneling, which is the process of placing an entire packet within another packet and sending it over a network. The protocol of the outer packet is understood by the network and both points, called tunnel interfaces, where the packet enters and exits the network.

The invention claimed is:

1. A method of rendering a virtual environment, said virtual environment having a virtual model, comprising:
   identifying a user entering the virtual environment and user context in the virtual model;
   rendering an output of the virtual model using objects in the virtual model;
   locating, in associated user memory, previous versions of the objects in the virtual model;
   identifying differences between the objects in the virtual model and the previous versions of the objects located in the user memory; and
   rendering a layer of the identified differences on the rendered output of the virtual model by modifying the objects in the virtual model based on user preference, wherein an identified difference is rendered differently than another identified difference according to the user preference and according to type of object.

2. A method according to claim 1 further comprising identifying a subset of the virtual model according to the user context comprising objects within a particular range of the user, wherein the subsequent steps in the method only consider objects identified in the subset.

3. A method according to claim 1 further comprising identifying a subset of the previous versions of the objects located in the user memory according to the user context comprising objects within a particular range of the user, wherein the subsequent steps in the method only consider objects identified in the subset.

4. A method according to claim 1 wherein the identified difference is defined according to at least one of: the type of object, difference, or magnitude of difference.

5. A method according to claim 1 wherein, according to the user preference, a new object is identified by at least one of: marking, highlighting, shading, or flashing.

6. A method according to claim 5 wherein an object that exists in the user memory but is no longer in the virtual model is shown as a diminished image in the virtual model.

7. A method according to claim 1 wherein, according to the user preference, a change in a changed object is indicated by at least one of: highlighting, shading, or flashing.

8. A method according to claim 1 wherein, according to the user preference, a change in a changed object has an indication of a time since the object was changed or last viewed by the user.

9. A method of rendering a virtual environment, said virtual environment having a virtual model, comprising:
   identifying a user entering the virtual environment and user context in the virtual model;
   rendering an output of the virtual model using objects in the virtual model;
   locating, in associated user memory, previous versions of the objects in the virtual model;
   identifying differences between the objects in the virtual model and the previous versions of the objects located in the user memory; and
   rendering a layer of the identified differences on the rendered output of the virtual model indicating the identified differences by at least one of: highlighting, shading, or flashing an object based on user preference, and further indicating a time since the object was changed or last viewed by the user, and wherein an identified difference is rendered differently than another identified difference according to the user preference and according to type of object.

10. A method according to claim 9 further comprising identifying a subset of the virtual model and user memory according to the user context comprising objects within a particular range of the user; wherein the subsequent steps in the method only consider objects identified in the subset.

11. A method according to claim 9 wherein the identified difference is defined according to at least one of: the type of object, difference, or magnitude of difference.

12. A method according to claim 1 wherein, according to the user preference, a new object is indicated by at least one of: marking, highlighting, shading, or flashing and wherein an object that exists in the user memory, but is no longer in the virtual model, is shown as a diminished image in the virtual model.

13. A system of rendering a virtual environment, said virtual environment having a virtual model, comprising:
   an input interface for identifying a user entering the virtual environment and user context in the virtual model;
   a rendering engine for rendering an output of the virtual model using objects in the virtual model;
   a difference engine for locating, in associated user memory, previous versions of the objects in the virtual model and for identifying specified differences between the objects in the virtual model and the previous versions of the objects located in the user memory; and
   wherein said rendering engine is further adapted for rendering a layer of the identified differences on the rendered output of the virtual model by modifying the objects in the virtual model based on user preference, and wherein an identified difference is rendered differently than another identified difference according to the user preference and according to type of object.

14. A system according to claim 13 further comprising identifying a subset of the virtual model according to the user context comprising objects within a particular range of the user.

15. A system according to claim 13 further comprising identifying a subset of the previous versions of the objects located in the user memory according to the user context comprising objects within a particular range of the user.

16. A system according to claim 13 wherein the identified difference is defined according to at least one of: the type of object, difference, or magnitude of difference.

17. A system according to claim 13 wherein, according to the user preference, a new object is identified by at least one of: marking, highlighting, shading, or flashing.

18. A system according to claim 13 wherein an object that exists in the user memory but is no longer in the virtual model is shown as a diminished image in the virtual model.

19. A system according to any of claim 13 wherein, according to the user preference, a change in a changed object is indicated by at least one of: highlighting, shading, or flashing.

20. A system according to any of claim 13 wherein a change in a changed object has an indication of a time since the object was changed or last viewed by the user.

21. A computer program product for simulating a virtual environment having a virtual model, said computer program product comprising:
   a computer usable medium having computer usable program code embodied therewith, said computer usable program code comprising:
   a computer usable program code configured to:
   identify a user entering the virtual environment and user context in the virtual model;
   render an output of the virtual model using objects in the virtual model; locate, in associated user memory, previous versions of the objects in the virtual model;
   identify specified differences between the objects in the virtual model and the previous versions of the objects located in the user memory; and
   render a layer of the identified differences on the rendered output of the virtual model by modifying the objects in the virtual model based on user preference, wherein an identified difference is rendered differently than another identified difference according to the user preference and according to type of object.

22. A computer program product according to claim 21 wherein said computer usable program code is further configured to identify a subset of the virtual model according to the user context comprising objects within a particular range of the user, wherein subsequent steps only consider objects identified in the subset.

23. A computer program product according to claim 21 wherein said computer usable program code is further configured to identify a subset of previous versions of the objects located in the user memory according to the user context comprising objects within a particular range of the user, wherein subsequent steps in the method only consider objects identified in the subset.

24. A computer program product according to claim 21 wherein said computer usable program code is further configured to define identified differences according to at least one of: the type of object, difference, or magnitude of difference.

* * * * *